F. A. BARR.
CORN-PLANTER.

No. 183,624.  Patented Oct. 24, 1876.

Attest:
C. A. Snow
Wm. Bagger.

Inventor:
Francis A. Barr,
by Louis Bagger & Co.,
his Attys.

N. PETERS, PHOTO-LITHOGRAPHER, WASHINGTON, D. C.

UNITED STATES PATENT OFFICE.

FRANCIS A. BARR, OF HESTER, MISSOURI.

IMPROVEMENT IN CORN-PLANTERS.

Specification forming part of Letters Patent No. 183,624, dated October 24, 1876; application filed April 12, 1876.

*To all whom it may concern:*

Be it known that I, F. A. BARR, of Hester P. O., in the county of Marion and State of Missouri, have invented certain new and useful Improvements in Corn-Planters; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1:
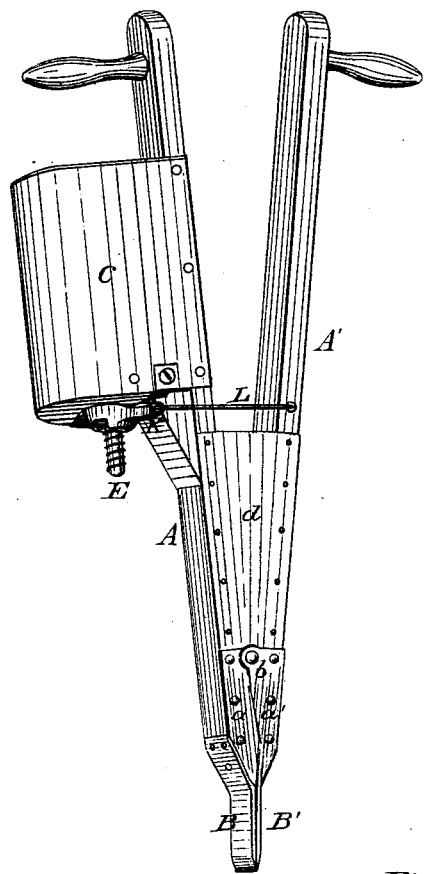
Figure 2:
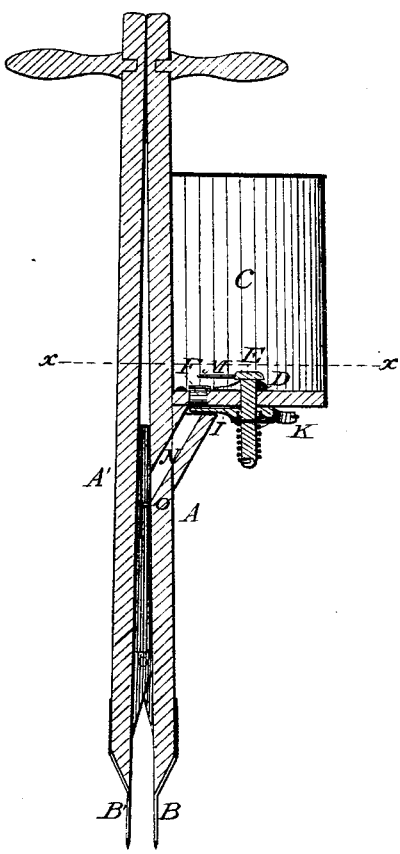
Figure 3:
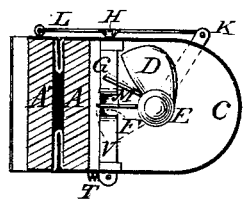
Figure 4:
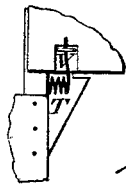

Figure 1 is a perspective view. Fig. 2 is a longitudinal section, and Fig. 3 is a cross-section after the line indicated by $x\ x$ in Fig. 2; and Fig. 4 is a detail view of part of my improved corn-planter.

Similar letters indicate corresponding parts.

The object of my invention is to produce a cheap and effectual means for planting corn or other seeds by hand-power; and its construction and operation are as hereinafter more fully shown and described.

In the drawing, A A' are two legs, which are hinged together by means of projecting metallic plates $a\ a'$, one of which is placed on each side of the bottom of the legs, $b\ b$ being the hinges or pivots by which they are secured together. $d\ d$ are side pieces, made of flexible material, and secured to the legs A A', for the purpose of preventing them from spreading too far. The bottoms of legs A A' are shod with metallic blades B B', which enter the ground, preparing an opening for the seeds, which are to fall between them into the ground thus prepared, which will close over the seeds, and cover them at the proper depth, when the blades are withdrawn.

A magazine or hopper, C, is secured to the side of leg A, and a dropping-slide, D, is pivoted to the bottom of the hopper by a central pin, E. This slide, when the corn-planter is open, as in Fig. 1, covers the seed cup or orifice F, the size of which may be regulated by a slide, G, operated from the outside of the hopper by a set-screw, H. Below this seed-cup is another sliding plate, I, placed at right angles with the dropping-slide D, so that when one of the slides is withdrawn from the seed-cup it is covered by the other. The central pin E, to which both of these slides are attached, is operated by a projecting arm, K, which is connected, by a rod, L, with the leg A', as shown. To the pin E is secured, above slide D, the clearers M M, which consist simply of pieces of wire, which will keep the seed-cup from getting choked.

In order to further effectually prevent the planter from becoming stuffed or choked with the grain, I construct the side of the seed-cup F opposite that form by slide G of another slide, V. which is kept in place by a coiled spring, T, on the outside of the machine, as shown in Fig. 4. By this arrangement it will be easily seen that wherever the cup F is becoming choked the action of clearers M upon the contents of the cup will force slide V aside, thus allowing the contents to drop, in the usual manner.

The operation of my improved corn-planter is as follows: The seed-cup F being adjusted to the proper size, the hopper C is then filled with grain, and the blades B B' are brought together, as shown in Fig. 1, preparatory to being forced into the ground. After being forced into the ground, which is easily done, the edges of the blades B being sharpened, the top parts of the legs A A' are brought together, thus forcing blades B apart, and, by the same operation, operating slides D and G, thus allowing the seed contained in the seed-cup to drop through tube N, and fall between legs A A' into the opening in the ground prepared by blades B. On the inside of leg A, below the opening of tube N, is a projection, O, which serves as a scatterer for the falling seeds. The planter is then withdrawn from the ground, which closes itself over the seeds, covering them at a proper depth, which may be regulated by the length of the blades B.

Having thus described my invention, I claim and desire to secure by Letters Patent of the United States—

1. The combination of the pivoted legs A A', having hopper C, with the central pin E, having slides D G, and arm K, operated by rod L, substantially in the manner and for the purpose herein shown and specified.

2. In a hand corn-planter, the combination of slides G V, clearers M, and coiled spring T, substantially as and for the purpose herein shown and specified.

In testimony that I claim the foregoing as my own I have affixed my signature in presence of two witnesses.

FRANCIS ANDERSON BARR.

Witnesses:
  W. F. AUSTIN,
  J. L. HATCHER.